US010939525B2

(12) United States Patent
Sengodan et al.

(10) Patent No.: US 10,939,525 B2
(45) Date of Patent: Mar. 2, 2021

(54) DRIVING LIGHT EMITTING DIODES AND DISPLAY APPARATUS

(71) Applicant: GOODRICH LIGHTING SYSTEMS, INC., Oldsmar, FL (US)

(72) Inventors: Rajkumar Sengodan, Tamilnadu (IN); Vigneshwaran Kalaimani, Bengaluru (IN)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 0 days.

(21) Appl. No.: 16/445,349

(22) Filed: Jun. 19, 2019

(65) Prior Publication Data

US 2020/0337125 A1    Oct. 22, 2020

(30) Foreign Application Priority Data

Apr. 18, 2019    (IN) .............................. 201911015618

(51) Int. Cl.
    *H05B 45/37*      (2020.01)
    *H05B 33/00*      (2006.01)
    *H05B 45/10*      (2020.01)
    *H05B 45/48*      (2020.01)
    *H05B 45/50*      (2020.01)

(52) U.S. Cl.
    CPC .................................. *H05B 45/37* (2020.01)

(58) Field of Classification Search
    CPC . H05B 6/68; H05B 6/80; H05B 45/10; H05B 45/37; H05B 45/48; H05B 33/08; H05B 45/00; H05B 41/2928; H05B 45/20; H05B 45/46; H05B 47/105; H05B 33/145; H05B 41/2886; H05B 41/2888; H05B 41/3921; H05B 45/375; H05B 45/38;

(Continued)

(56) References Cited

U.S. PATENT DOCUMENTS 6,359,392 B1    3/2002    He
7,034,601 B2    4/2006    Carmina et al.
(Continued)

FOREIGN PATENT DOCUMENTS

EP        3342258 A1    7/2018
GB       2536851 A     10/2016
WO   2017093170 A1    6/2017

OTHER PUBLICATIONS

European Search Report; European Application No. 19212574.8; Application Filed: Nov. 29, 2019; report dated Jun. 16, 2020; 10 pages.

*Primary Examiner* — Wei (Victor) Y Chan
(74) *Attorney, Agent, or Firm* — Cantor Colburn LLP

(57) ABSTRACT

Systems and methods for light emitting diodes (LEDs) circuits are provided. Aspects include a set of light emitting diodes (LEDs) arranged in series between a first node and a second node, a power supply coupled to the first node, a first switching element arranged in series between the first node and a third node, wherein the first switching element is in parallel with the set of LEDs, a first charge pump coupled to the third node, a controller configured to operate the first switching element by providing a control voltage for switching the first switching element between an ON and an OFF, wherein the control voltage comprises a switching frequency, and wherein the first charge pump is charged by the power supply responsive to the switching element being in an ON state.

18 Claims, 3 Drawing Sheets

(58) Field of Classification Search
CPC .......... H05B 45/44; H05B 45/50; H05B 6/10;
H05B 11/00; H05B 1/0269; H05B
2213/07; H05B 33/20; H05B 33/26;
H05B 3/56; H05B 3/746; H05B 3/82;
H05B 41/04; H05B 41/16; H05B 41/18;
H05B 47/11; H05B 6/062; H05B 6/101;
H05B 6/6447
See application file for complete search history.

(56) References Cited

U.S. PATENT DOCUMENTS

| | | | |
|---|---|---|---|
| 7,116,086 B2 | 10/2006 | Burgyan et al. | |
| 7,271,642 B2 | 9/2007 | Chen et al. | |
| 7,436,015 B2 | 10/2008 | Tanaka et al. | |
| 8,492,998 B2 | 7/2013 | Hwang et al. | |
| 8,947,011 B2 | 2/2015 | Ladret et al. | |
| 10,143,046 B2 | 11/2018 | Delos Ayllon et al. | |
| 2001/0043113 A1* | 11/2001 | Hoshino | H05B 45/37 |
| | | | 327/534 |
| 2006/0109205 A1 | 5/2006 | Deng | |
| 2007/0200615 A1 | 8/2007 | Eklund et al. | |
| 2010/0049454 A1* | 2/2010 | Irissou | H05B 45/58 |
| | | | 702/58 |
| 2012/0051757 A1* | 3/2012 | Nishino | H04B 10/116 |
| | | | 398/201 |
| 2012/0062122 A1* | 3/2012 | Xi | H05B 45/50 |
| | | | 315/120 |
| 2013/0175942 A1 | 7/2013 | Mainguet | |
| 2020/0037410 A1* | 1/2020 | Stoneham | H05B 45/10 |

* cited by examiner

DRIVING LIGHT EMITTING DIODES AND DISPLAY APPARATUS

CROSS-REFERENCE TO RELATED APPLICATIONS

This application claims the benefit of Indian provisional application no. 201911015618 filed Apr. 18, 2019, which is incorporated herein by reference in its entirety.

BACKGROUND

The present invention generally relates to light emitting diodes (LEDs), and more specifically, to circuit and method for driving LEDs and display apparatus.

A light-emitting diode (LED) circuit (also referred to as an LED driver) is an electrical circuit used for an LED. The circuit provides sufficient current to light the LED at the required brightness, while also limiting the current to prevent damaging the LED.

The voltage drop across an LED is approximately constant over a wide range of operating current; therefore, a small increase in applied voltage greatly increases the current. Very simple circuits are used for low-power indicator LEDs. More complex, current source circuits are required when driving high-power LEDs for illumination to achieve correct current regulation. LED driving circuits can face drive voltage shortages utilizing conventional LED modules, especially when driving a large number of LEDs connected in series.

SUMMARY

Embodiments of the present invention are directed to system. A non-limiting example of the system includes a set of light emitting diodes (LEDs) arranged in series between a first node and a second node, a power supply coupled to the first node, a first switching element arranged in series between the first node and a third node, wherein the first switching element is in parallel with the set of LEDs, a first charge pump coupled to the third node, a controller configured to operate the first switching element by providing a control voltage for switching the first switching element between an ON and an OFF, wherein the control voltage comprises a switching frequency, and wherein the first charge pump is charged by the power supply responsive to the switching element being in an ON state.

Embodiments of the present invention are directed to a method for operating an LED circuit. A non-limiting example of the method includes operating, by a controller, a first switching element in the LED circuit by providing a control voltage for switching the first switching element between an ON state and an OFF state, wherein the LED circuit comprises a power supply coupled to a first node, a set of light emitting diodes (LEDs) arranged in series between the first node and a second node, the first switching element arranged in series between a first node and a third node, a first charge pump coupled to the third node, switching the first switching element to an ON state to charge the first charge pump by the power supply.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Turning now to an overview of technologies that are more specifically relevant to aspects of the invention, LEDs can be utilized in many power sensitive applications such as, for example, displays and low power electronic devices in aircraft lighting systems, aircraft interiors, aircraft display, landing lights, strobe lights for flashing emergency needs, automobiles, and commercial uses. However, as mentioned above, current LED driving circuits suffer from shortages in LED drive voltages and power loss.

The above-described aspects of the invention address the shortcomings of the prior art by providing an LED driving circuit which yields LED drive more efficiently. Aspects include a circuit topology that can be configured in energy efficient LED applications where power consumption can be an issue. The LED driving circuit described herein drives an array of LEDs by utilizing an inductor/transformer to provide step-up voltage or by utilizing a capacitive multiplier. This LED driving circuit solves the problem of dissipating additional charges in the inrush current limiting resistor during capacitor discharging phase and different step-up voltage levels can be achieved. By this, the power dissipation and efficiency is improved with fewer components than would typically be required.

Figure 1:
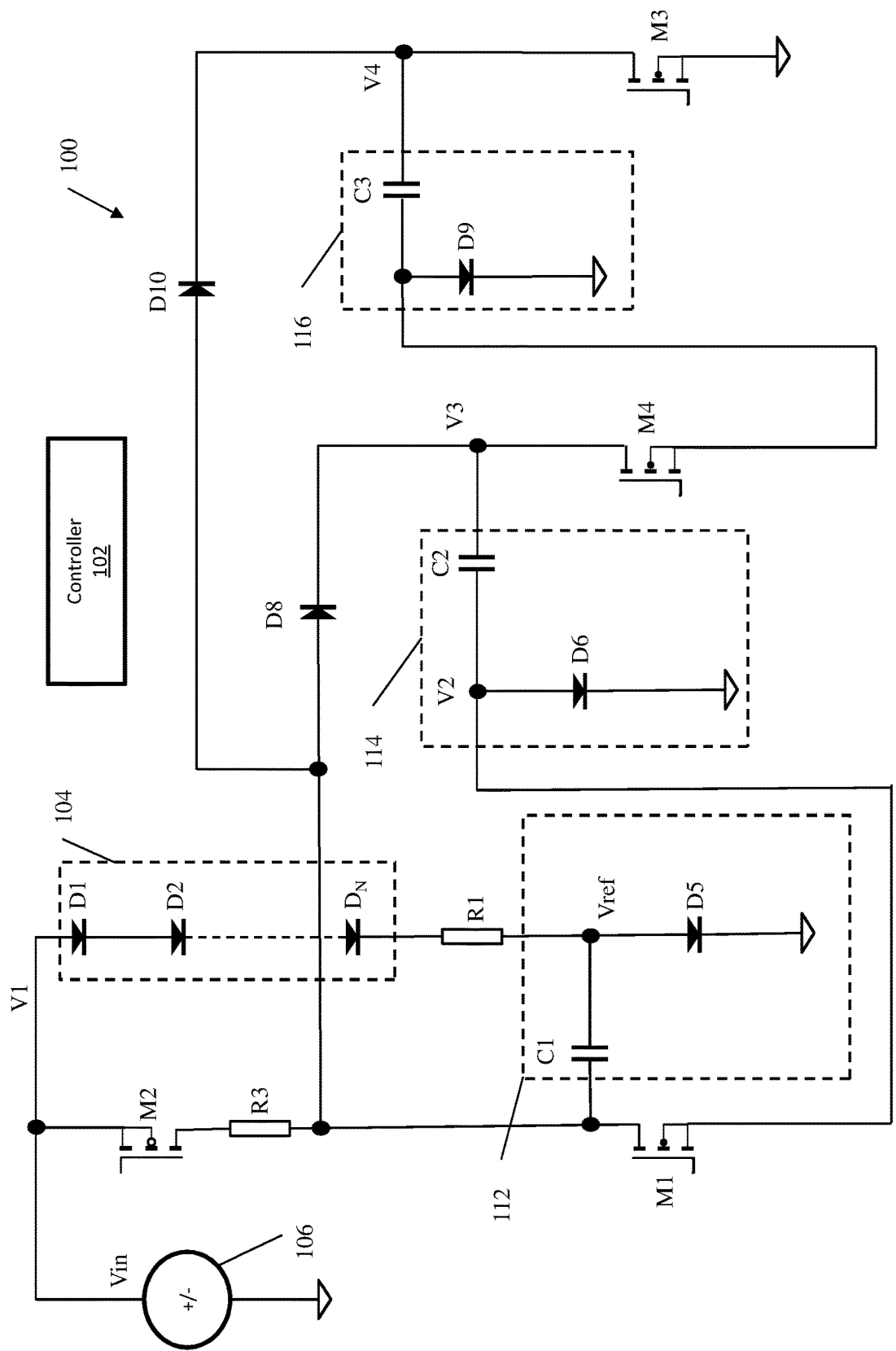
FIG. 1 depicts a block diagram of a circuit topology driving a set of light emitting diodes according to one or more embodiments.

FIG. 1 depicts a block diagram of a circuit topology driving a set of light emitting diodes according to one or more embodiments. The circuit topology 100 includes a controller 102 and a set 104 of light emitting diodes D1, D2, ... $D_N$. (Herein, N represents a positive integer value greater than 2). The controller 102 is configured to control the switching elements M1, M2, M3, and M4 in the circuit topology 100. That is to the say, the controller 102 can controller whether any of the switching elements are in an 'On' position or in an 'Off' position. In one or more embodiments, the switching elements M1, M2, M3, and M4 are field effect transmitters (FETs) where M2 is a P-MOS type FET and M1, M3, and M4 are each an N-MOS type FETs. The set 104 of LEDs (D1, D2, ... $D_N$) are in series connected to a first node and a second node in the circuit topology 100. The first node is also attached to a power supply 106. The second node is also attached to a resister R1. In some embodiments, the resister R1 is a current limiting resister with a resistance value of about 50 ohms to 200 ohms.

In one or more embodiments, the set 104 of LEDs that are connected in series can be driven by this topology 100 which enables the same current flowing through the set 104 of LEDs, and thus provides a better homogeneity of the LEDs' luminance. By utilizing an LED drive circuit with a ladder charge pump, the circuit topology 100 utilizing lower input voltage and is not limited to the number of LEDs connected.

In one or more embodiments, the switching elements M1, M2, M3, and M4 will generate a voltage magnitude required to drive the set 104 of LEDs. Switching period is controlled, by the controller 102, to regulate the voltage across the charge pump capacitor C1, C2, and C3 based on the desired current. A charge pump is a kind of DC to DC converter that uses capacitors for energetic charge storage to raise or lower voltage. The system 100 includes three charge pumps 112, 114, 116. These charge pumps 112, 114, 116 will provide an increase (or step-up) in voltage for the system 100. For example, these charge pumps will provide voltage of 1×, 2×, 3×, ... nx (where n is chosen with respect to the switching frequency and the capacitor value in order to supply the required LED current to drive the set 104 of LEDs).

The charge pumps step up the voltage supplied for the circuit topology 100 according to the following described formula. A time constant ($\tau$) of capacitor can be derived from equation 1. Based on equation 1, the frequency is (f)=1/$\tau$. Where, R=R3 and C=C1, C2, C3 ... Cn. Equivalent capacitance during charging phase is the sum of capacitance C1, C2, C3 ... Cn. The voltage across each capacitor is given as equation 2. I(t) is determined by Vin and R3. During discharging phase the capacitor C1, C2, C3, Cn will be in series R1 and LEDs. R1 and number of LEDs will determine the rate at which capacitor to be discharged.

$$\tau = RC \quad (1)$$

$$V_C = \frac{1}{C} \int I(t)dt \quad (2)$$

In one or more embodiments, the controller 102 provides a control voltage for the switching elements M1, M2, M3, and M4 at a predefined switching frequency. The switching frequency can be greater than 200 Hz so as to avoid human eye visual problems of the LEDs; however, the switching frequency can be lower than 200 Hz in some embodiments. In one or more embodiments, the controller 102 can be an astable based multi-vibrator having constant $t_{on}/t_{off}$ for fixed brightness or a microcontroller to control duty cycle of the LEDs for dimming.

In one or more embodiments, the set 104 of LEDs can be any number of LEDs driven by the LED driving circuit. For example, for a set of 10 LEDs with a breakdown voltage of 3.5V each, and a minimum require voltage should be 35V. The power supply 106 for this example can be 15V (i.e., Vin=15V) and the charge pumps 112, 114, 116 will step up this voltage to 35V where the remaining voltage will drop across the series resistance R1 which provides the controlled current for LED operation. Further, the on/off time of the switching elements M1, M2, M3, and M4 can be controlled, by the controlled 102, to achieve adjustable luminance making dimming on the LEDs, which can be, for example, white LEDs. As shown in the illustrated example, switching elements M1, M3, and M4 are N-MOS type FETs and M2 is a P-MOS type FET which operates as a switch for the charge pump circuits 112, 114, 116. The circuit 100 includes the voltage nodes V1, V2, V3, and V4. Vref is taken as reference node to evaluate the charge pumps 112, 114, 116 voltage levels. The capacitor C1 provides the first charge pump 112 voltage, capacitor C2 provides the second charge pump 114 voltage, and capacitor C3 provides the third charge pump 116 voltage. These capacitors C1, C2, C3 are configured to and arranged in the circuit topology 100 to provide negative voltage with respect to the positive voltage input (Vin). This in turn will sum up with Vin so that the net voltage is Vin=V1−V2−V3−V4. For calculating V1, V1=Vin+V2+V3+V4.

In one or more embodiments, the controller 102 can operate the switching elements as follows. At an initial state, switching element M2 is OFF and M1, M3, and M4 are OFF. At this initial state, Vin is much less than the LED set 104 forward bias voltage and therefore the LED set 104 is in an OFF state.

In one or more embodiments, when switching element M2 is turned ON and M1, M3, M4 are OFF, as controlled by the controller 102, capacitors C1, C2, C3 will be charged through diodes D5, D6, and D9. Diodes D8, D10 will provide isolation between the capacitor banks. Then, when switching element M2 is turned OFF and M1, M3, M4 are ON, the capacitors C1, C2, C3 will discharge through M1, M4, M3 switching elements in-series with Vin and the set 104 of LEDs. This causes the net voltage of node V1 to be the sum of the capacitor voltage and input voltage. Also, resistor R3 can have a resistance of any value to limit the inrush current for the charging circuit. For an input voltage Vin=15V, the voltage is calculated by using Vin=15V, V2=15V, V3=15V, V4=15V, where V1=Vin+V2+V3+V4=60V.

In one or more embodiments, the controller 102 or any of the hardware referenced in the system 200 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 2:
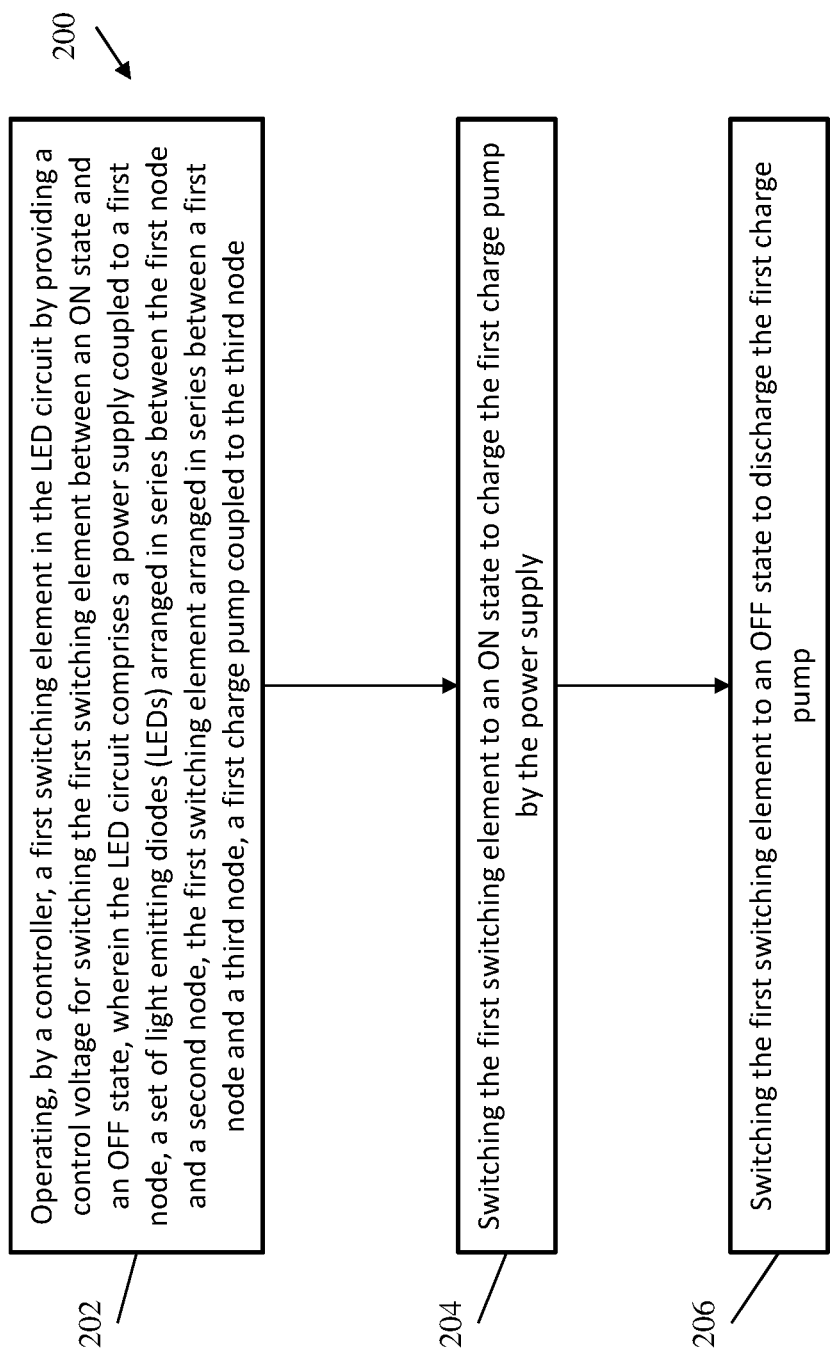
FIG. 2 depicts a block diagram of a operating an LED circuit according to one or more embodiments.

FIG. 2 depicts a block diagram of a method for operating an LED circuit according to one or more embodiments. The method 200 includes operating, by a controller, a first switching element in the LED circuit by providing a control voltage for switching the first switching element between an ON state and an OFF state, wherein the LED circuit comprises a power supply coupled to a first node, a set of light emitting diodes (LEDs) arranged in series between the first node and a second node, the first switching element arranged in series between a first node and a third node, a first charge pump coupled to the third node as shown in block 202. At block 204, the method 200 includes switching the first switching element to an ON state to charge the first charge pump by the power supply. And at block 206, the method 200 includes switching the first switching element to an OFF state to discharge the first charge pump.

Additional processes may also be included. It should be understood that the processes depicted in FIG. 2 represent illustrations, and that other processes may be added or existing processes may be removed, modified, or rearranged without departing from the scope and spirit of the present disclosure.

Figure 3:
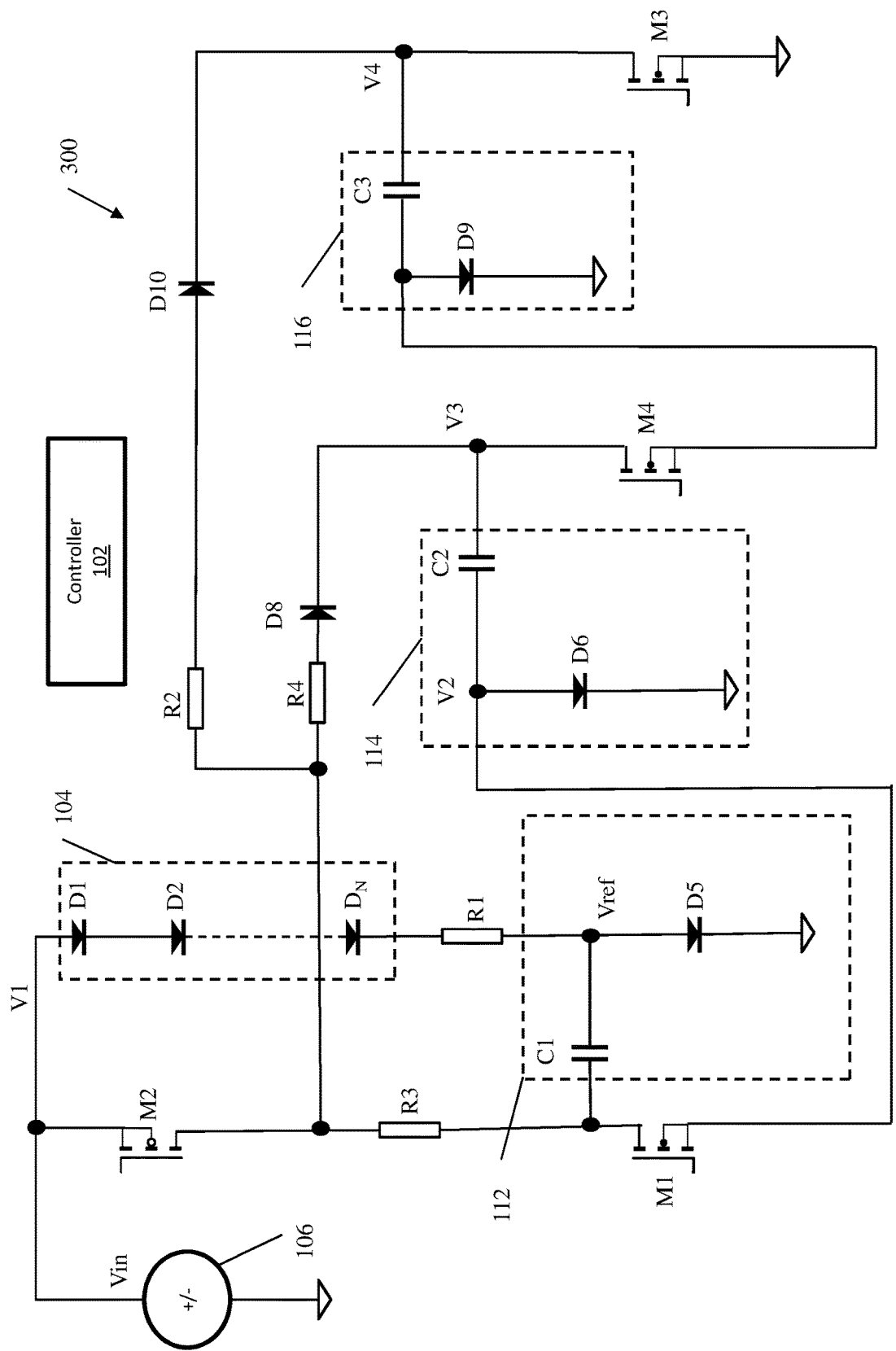
FIG. 3 depicts a block diagram of a circuit topology driving a set of light emitting diodes according to one or more embodiments.

FIG. 3 depicts a block diagram of a circuit topology driving a set of light emitting diodes according to one or more embodiments. In addition, since the circuit topology 300 is similar to that of the system 100 according to FIG. 1, like elements refer to like reference numerals and detailed description thereof is omitted to the extent that the like elements are the same. The circuit topology 300 includes resistors R2 and R3 that can be utilized in conjunction with R4 to provide independent current control to each respective capacitors (C1, C2, C3) in the charge pumps 112, 114, 116. As described above, the charge pumps step up the voltage supplied for the system 300 according to the following described formula. A time constant ($\tau$) of capacitor can be derived from equation 1. Based on equation 1 (previously referenced), the frequency is (f)=1/$\tau$. Where, R=R3 and C=C1, C2, C3 . . . Cn. Equivalent capacitance during charging phase is the sum of capacitance C1, C2, C3 . . . Cn. The voltage across each capacitor is given as equation 2 (previously referenced). I(t) is determined by Vin and R3. During discharging phase the capacitor C1, C2, C3, Cn will be in series R1 and LEDs. R1 and number of LEDs will determine the rate at which capacitor to be discharged.

In one or more embodiments, providing time constant can be described with respect to resistors R2, R3, R4. This resistor arrangement provides independent current control to each capacitor. Thereby if R2=R3=R4 and C1=C2=C3 then it is possible to charge Vc1=Vc2=Vc3 (i.e., same voltage across each capacitor). If resistor R2, R3, R4 are of different values then the charging time will vary for each capacitor; therefore the voltage across each capacitor will vary due to different R2, R3, R4 values. Similarly if C1, C2, C3 of different value and R2=R3=R4 then this combination will achieve different voltage levels across each capacitor.

The term "about" is intended to include the degree of error associated with measurement of the particular quantity based upon the equipment available at the time of filing the application.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a set of light emitting diodes (LEDs) arranged in series between a first node and a second node;
   a power supply coupled to the first node;
   a first switching element arranged in series between the first node and a third node, wherein the first switching element is in parallel with the set of LEDs;
   a first charge pump comprising a first capacitor and a first diode, wherein the first capacitor is coupled between the third node and the second node, and wherein the first diode is coupled between the second node and ground;
   a second switching element arranged in series between the third node and a fourth node;

a second charge pump coupled to the fourth node and a fifth node, wherein the second charge pump is in series with the first charge pump;
a resistive element and a blocking diode, wherein the resistive element is in series with the blocking diode, and wherein the resistive element and blocking diode are coupled between the third node and the fifth node;
a controller configured to:
  operate the first switching element by providing a control voltage for switching the first switching element between an ON and an OFF, wherein the control voltage comprises a switching frequency; and
  wherein the first charge pump is charged by the power supply responsive to the switching element being in an ON state.

2. The system of claim 1, wherein a discharge path of the first capacitor is in series with the power supply and the set of LEDs.

3. The system of claim 1 further comprising:
wherein the controller is further configured to:
  operate the second switching element by providing the control voltage for switching the second switching element between an OFF and an ON.

4. The system of claim 3 further comprising:
a third switching element arranged in series between the fifth node and a sixth node;
a third charge pump coupled to the sixth node and a seventh node; and
wherein the controller is further configured to:
  operate the third switching element by providing the control voltage for switching the second switching element between an OFF and an ON.

5. The system of claim 4 further comprising:
a fourth switching element coupled to the seventh node and coupled to ground; and
wherein the controller is further configured to:
  operate the third switching element by providing the control voltage for switching the second switching element between an OFF and an ON.

6. The system of claim 1, wherein the first switching element comprises a P-MOS type field effect transistor (FET).

7. The system of claim 3, wherein the second switching element comprises an N-MOS type field effect transistor.

8. The system of claim 1, wherein the controller comprises an astable based multi-vibrator.

9. The system of claim 1, wherein the switching frequency is about 200 Hertz.

10. The system of claim 1, wherein the switching frequency is greater than 200 Hertz.

11. A method for operating an LED circuit comprising:
operating, by a controller, a first switching element in the LED circuit by providing a control voltage for switching the first switching element between an ON state and an OFF state;
wherein the LED circuit comprises:
  a power supply coupled to a first node;
  a set of light emitting diodes (LEDs) arranged in series between the first node and a second node;
  the first switching element arranged in series between a first node and a third node;
  a first charge pump comprising a first capacitor and a first diode, wherein the first capacitor is coupled between the third node and the second node, and wherein the first diode is coupled between the second node and ground;
  a second switching element arranged in series between the third node and a fourth node;
  a second charge pump coupled to the fourth node and a fifth node, wherein the second charge pump is in series with the first charge pump;
  a resistive element and a blocking diode, wherein the resistive element is in series with the blocking diode, and wherein the resistive element and blocking diode are coupled between the third node and the fifth node;
switching the first switching element to an ON state to charge the first charge pump by the power supply.

12. The method of claim 11, wherein a discharge path of the capacitor is in series with the power supply and the set of LEDs.

13. The method of claim 11, further comprising:
switching the first switching element to an OFF state to discharge the first charge pump.

14. The method of claim 11, wherein the LED circuit further comprises:
operating a second switching element by providing the control voltage for switching the second switching element between an OFF and an ON.

15. The method of claim 11, wherein the first switching element comprises a P-MOS type field effect transistor (FET).

16. The method of claim 14, wherein the second switching element comprises an N-MOS type field effect transistor.

17. The method of claim 11, wherein the controller comprises an astable based multi-vibrator.

18. The method of claim 11, wherein the switching frequency is greater than 200 Hertz.

* * * * *